(12) United States Patent
Maharajh et al.

(10) Patent No.: US 11,397,713 B2
(45) Date of Patent: Jul. 26, 2022

(54) HISTORICAL GRAPH DATABASE

(71) Applicant: AT&T Intellectual Property I, L.P., Atlanta, GA (US)

(72) Inventors: Robby Maharajh, South Richmond Hill, NY (US); William Reehil, Jackson, NJ (US); Soumya Naik, Freehold, NJ (US); Harish Venkata Kajur, Piscataway, NJ (US); Manisha Aggarwal, Marlboro, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 266 days.

(21) Appl. No.: 16/674,100

(22) Filed: Nov. 5, 2019

(65) Prior Publication Data

US 2021/0133170 A1 May 6, 2021

(51) Int. Cl.
*G06F 16/00* (2019.01)
*G06F 16/21* (2019.01)
*G06F 16/903* (2019.01)
*G06F 16/901* (2019.01)

(52) U.S. Cl.
CPC ........ *G06F 16/219* (2019.01); *G06F 16/9024* (2019.01); *G06F 16/90335* (2019.01)

(58) Field of Classification Search
CPC ............. G06F 16/219; G06F 16/90335; G06F 16/9024
USPC ........................................................ 707/695
See application file for complete search history.

(56) References Cited

U.S. PATENT DOCUMENTS

| | | | |
|---|---|---|---|
| 9,659,043 B2 | 5/2017 | DaCosta et al. | |
| 10,824,676 B2 | 11/2020 | Ogrinz et al. | |
| 2015/0074044 A1 | 3/2015 | Metreveli et al. | |
| 2017/0212945 A1 | 7/2017 | Shankar et al. | |
| 2017/0262521 A1 | 9/2017 | Cho et al. | |
| 2017/0262551 A1 | 9/2017 | Cho | |
| 2017/0277769 A1 | 9/2017 | Pasupathy et al. | |
| 2018/0089331 A1 | 3/2018 | Long et al. | |
| 2018/0239796 A1 | 8/2018 | Song et al. | |
| 2018/0246987 A1* | 8/2018 | Das | G06F 16/9024 |
| 2018/0349002 A1* | 12/2018 | Kindelsberger | G06F 3/04847 |
| 2018/0357329 A1 | 12/2018 | Meyer et al. | |
| 2019/0026334 A1 | 1/2019 | Ma et al. | |
| 2020/0097615 A1 | 3/2020 | Song et al. | |
| 2020/0175071 A1* | 6/2020 | Ogrinz | G06F 16/284 |
| 2020/0409931 A1 | 12/2020 | Zang et al. | |

(Continued)

*Primary Examiner* — Chelcie L Daye

(57) ABSTRACT

A processing system including at least one processor may be maintain an historical graph database storing historical graph state information for a graph including a set of elements, where the historical graph state information includes, for each element, respective element state information and respective state version tracking information for the respective element. The processing system may receive an event indicative of a management action associated with a first element, where the first element may include a new element to be added to the graph or an existing element of the set of elements. The processing system may update, based on the event, the historical graph state information of the historical graph database, where the updating may include providing respective state version tracking information for the first element, and handle, based on the historical graph database, a query to retrieve a set of information of the graph.

20 Claims, 5 Drawing Sheets

(56) References Cited

U.S. PATENT DOCUMENTS

2021/0011913 A1 1/2021 Chandramouli et al.
2021/0026894 A1 1/2021 Yang et al.

* cited by examiner

HISTORICAL GRAPH DATABASE

The present disclosure relates generally to databases, and more particularly to methods, computer-readable media, and apparatuses for providing an historical graph database.

BACKGROUND

Graph databases are useful for organizing and managing large amounts of interconnected data. The ability to easily and efficiently retrieve data from graph databases is important as these data structures gain popularity.

SUMMARY

Methods, computer-readable media, and apparatuses for providing an historical graph database are described. For instance, in one example, a processing system including at least one processor may be configured to provide an historical graph database and use the historical graph database to handle queries. The processing system may maintain an historical graph database storing historical graph state information for a graph including a set of elements, where the historical graph state information includes, for each element in the set of elements, respective element state information for the respective element and respective state version tracking information for the respective element. The processing system may receive an event indicative of a management action associated with a first element, where the first element comprises a new element to be added to the graph or an existing element of the set of elements. The processing system may update, based on the event indicative of the management action associated with the first element, the historical graph state information of the historical graph database, where the updating includes providing respective state version tracking information for the first element. The processing system may handle, based on the historical graph database, a query to retrieve a set of information of the graph.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
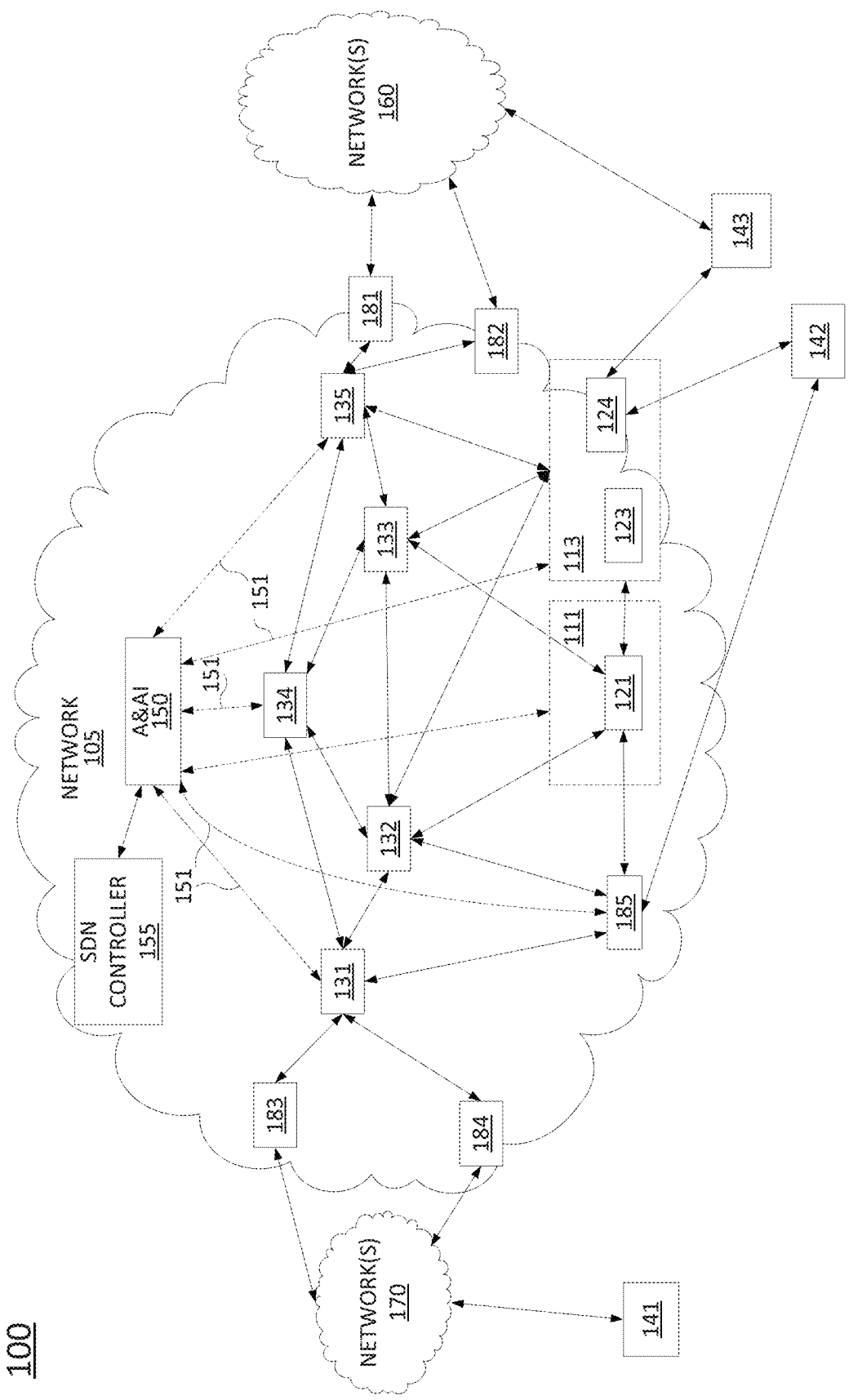
FIG. 1 illustrates an example system related to the present disclosure.

In one example, the present disclosure describes methods, computer-readable media, and apparatuses for providing an historical graph database. In one example, the present disclosure provides an historical graph database for a dataset, such as a dataset associated with a system (e.g., a system from which the dataset is obtained, a system described by the dataset, and so forth), a standalone dataset (e.g., data not necessarily associated with any particular system), and so forth. In one example, the historical graph database may be used to represent and store data of the dataset using a graph-based representation of the dataset that is based on a graph that includes elements which may be used to represent the data of the dataset (e.g., graph elements such as vertices, edges, and properties).

In one example, providing an historical graph database may include maintaining an historical graph database storing historical graph state information for a graph including a set of elements, where the historical graph state information includes, for each element in the set of elements, respective element state information for the respective element and respective state version tracking information for the respective element, receiving an event indicative of a management action associated with a first element, where the first element comprises a new element to be added to the graph or an existing element of the set of elements, and updating, based on the event indicative of the management action associated with the first element, the historical graph state information of the historical graph database, where the updating includes providing respective state version tracking information for the first element. In one example, the historical graph database may be used to handle a query to retrieve a set of information of the graph. It will be appreciated that the graph may be a graph-based representation of the data of the dataset that is represented and stored using the historical graph database and, thus, that the graph may be considered to provide a graph-based representation of an underlying system with which the dataset is associated (e.g., a communication network, a transportation system, an environmental ecosystems, an organizational structure, an entity relationship management system, a social network, and so forth). In other words, elements of the graph may be considered to refer to elements of the graph-based representation of the dataset, elements of the dataset represented by the graph-based representation of the dataset, elements of the underlying system with which the dataset represented by the graph-based representation of the dataset is associated, and so forth. It will be appreciated that providing an historical graph database including element state information for elements of the graph as well as state version tracking information associated with the element state information enables support for various types of enhanced queries on the graph (e.g., queries based on historical times, historical periods of time, and so forth, which may be provided at various granularities and time scales), which may be used to obtain various types of information of the graph (e.g., element relationships, element status, and so forth), which in turn may be used to support various types of management actions for the graph (e.g., analysis, reconfiguration, and so forth).

In one example, the historical graph database for the dataset may be provided in addition to a graph database provided for the dataset, in which case the graph database may be considered to be a real-time graph database for the dataset which is complemented by the historical graph database for the dataset. In this manner, the present disclosure supports an ability to capture the evolution of a real-time graph through each stage of its lifecycle, thereby enabling support for various management functions for the real-time graph (e.g., in the example of a communication network, the ability to capture the evolution of the communication network through each stage of its lifecycle enables understanding of network construction logic, quality assurance, troubleshooting, and various other management functions which may be performed for the communication network).

It will be appreciated that these and other examples of the present disclosure may be useful in various contexts within which graph databases may be used to represent and store data of a dataset, such as for managing communication networks, transportation systems, environmental ecosystems, organizational structure information, entity relationship information, social networks, and so forth. Accordingly, it will be appreciated that, although various examples of the present disclosure are primarily directed to providing historical graph databases for graph databases that represent and store data of a communication network, various examples of the present disclosure may be used within various other contexts in which graph databases may be used to represent and store various other types of data for various purposes. These and other aspects of the present disclosure are discussed in greater detail below in connection with the examples of FIGS. 1-5.

FIG. 1 illustrates a block diagram depicting one example of a communication network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network.

In one example, the network 105 may include a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additionally include components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) including virtual network functions (VNFs). In other words, at least a portion of the network 105 may incorporate software-defined network (SDN) components. In this regard, it should be noted that, as referred to herein, "traffic" may include all or a portion of a transmission, e.g., a sequence or flow, including one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may include separate domains, e.g., separate routing domains from the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. For instance, the traffic may relate to management actions performed on the network 105 (e.g., management actions such as create/update/delete (CRUD) operations, queries, and so forth). User devices 141-143 may include, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may include a cellular telephone which may connect to network 105 via network 170, e.g., a cellular access network. For instance, such an example network 170 may include one or more cell sites, e.g., including a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may include a serving gateway (SGW), a mobility management entity (MME), or the like. In one example, user device 142 may include a customer edge (CE) router which may provide access to network 105 for additional user devices (not shown) which may be connected to the CE router. For instance, in such an example, component 185 may include a provider edge (PE) router.

As mentioned above, various components of network 105 may include virtual network functions (VNFs) which may physically include hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may include shared hardware, e.g., one or more host devices including line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143.

In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may include host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server (MS), a domain name service (DNS) server, a packet data network gateway (PGW), a gateway mobile switching center (GMSC), a short message service center (SMSC), etc.

In one example, network 105 includes a software defined network (SDN) controller 155. In one example, the SDN controller 155 may comprise a computing device or processing system (e.g., a server), such as computing system 500 depicted in FIG. 5, and may be configured to provide one or more operations or functions in connection with examples of the present disclosure for providing an historical graph database for a dataset.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may include secure tunnels for signaling communications over an underling IP infrastructure of network 105. In other words, the control links may include virtual links multiplexed with transmission traffic and other data traversing network 105 and carried over a shared set of physical links. For ease of illustration the control links are omitted from FIG. 1. In one example, the SDN controller 155 also may include a virtual machine operating on NFVI/host device(s), or may include a dedicated device. For instance, SDN controller 155 may be collocated with one or more VNFs, or may be deployed in a different host device or at a different physical location.

In one example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In one example, SDN controller 155 may represent a processing system including a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

In one example, the network 105 may also include internal nodes 131-135, which may include various components, such as routers, switches, route reflectors, etc., cellular core network, IMS network, and/or VoIP network components, and so forth. In one example, these internal nodes 131-135 may also include VNFs hosted by and operating on additional NFVIs. For instance, as illustrated in FIG. 1, internal nodes 131 and 135 may include VNFs residing on additional NFVI (not shown) that are controlled by SDN controller 155 via additional control links. However, at least a portion of the internal nodes 131-135 may include dedicated devices or components, e.g., non-SDN reconfigurable devices.

In one example, the network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may include a serving gateway (SGW), a mobility management entity (MME), or the like. However, in another example, components 183 and 184 also may include PE routers interfacing with network(s) 170, e.g., for non-cellular network-based communications. In one example, components 181-185 also may include VNFs hosted by and operating on additional NFVI. However, in another example, at least a portion of the components 181-185 may include dedicated devices or components.

In one example, the network 105 includes an active and available inventory (A&AI) system 150. The A&AI system 150 may comprise a computing device or processing system (e.g., a server), such as computing system 500 depicted in FIG. 5, and may be configured to provide one or more operations or functions in connection with examples of the present disclosure for providing an historical graph database for a dataset. In one example, the A&AI system 150 may obtain network state information of the network and maintain the network state information of the network. It will be appreciated that the A&AI system 150 may obtain and may maintain the network state information in various ways and for various purposes (e.g., inventory management, network monitoring, network management, service provisioning, and so forth), as discussed further herein.

In one example, the network state information of the network may include various types of information associated with the network, such as component configuration information for various components of the network (e.g., nodes, links, paths, functions, and so forth), network topology information (e.g., information indicative of network connectivity for links and/or paths between components of the network), resource description information for resources of the network, service description information for services supported by the network, and so forth. For example, the network state information may include component configuration information for various physical and virtual components of network 105 and/or networks 160, 170, etc. (e.g., any of internal nodes 131-135, components 181-185, units 121, 123, and 124, NFVI 111 and 113, and the like), network topology information indicative of network connectivity for links and/or paths between components of the network 105 and/or networks 160, 170, etc. (e.g., between any of internal nodes 131-135, components 181-185, units 121, 123, and 124, NFVI 111 and 113, and the like), resource description information for resources of the network 105 and/or networks 160, 170, etc. (e.g., resources available from and/or used to provide any of internal nodes 131-135, components 181-185, units 121, 123, and 124, NFVI 111 and 113, and the like), service description information for services supported by the network 105 and/or networks 160, 170, etc. (e.g., services supported by any of internal nodes 131-135, components 181-185, units 121, 123, and 124, NFVI 111 and 113, and the like), and so forth. It will be appreciated that various other types of information may be included within the network state information of the network that is maintained by the A&AI system 150.

In one example, the network state information of the network may be obtained in various ways. The network state information of the network may be obtained by the A&AI system 150 from various sources of such information (e.g., elements of network 105 and/or networks 160 or 170, SDN controller 155, one or more other management systems included within or otherwise associated with network 105 and/or networks 160 or 170, and so forth). For example, the devices may send configuration and connectivity information to A&AI system 150, or any one or more of internal nodes 131-135, components 181-185, units 121, 123, and 124, NFVI 111 and 113, and so forth may include aggregation points for collecting configuration and connectivity information and forwarding the configuration and connectivity information to the A&AI system 150. For example, SDN controller 155 may provide configuration information for the network 105 to the A&AI system 150 based on control of the network 105 by the SDN controller 155. The network state information of the network may be obtained in real-time or near real-time based on an event stream of events indicative of management actions performed on the network (e.g., addition of new nodes, reconfiguration of existing nodes, termination of existing nodes, addition of new links, modification of existing links, termination of existing links, addition of new VNFs, reconfiguration of existing VNFs, termination of existing VNFs, and so forth), where the event stream may be provided from one or more sources (e.g., elements of network 105 and/or networks 160 or 170, SDN controller 155, one or more other management systems included within or otherwise associated with network 105 and/or networks 160 or 170, and so forth).

The network state information obtained by the A&AI system 150 may be maintained in one or more databases. For example, the network state information obtained by the A&AI system 150 may be maintained in one or more graph databases (e.g., given that the network may be considered to be a graph and, thus, is well-suited for representation in a graph database). In general, a graph database is a database that uses a graph structure to represent and store data of a dataset. In other words, the graph database provides a graph-based representation of the dataset. The graph database stores graph information of a graph which provides the graph-based representation of the dataset. The graph-based representation of the dataset may be based on a graph that includes elements which may be used to represent data of the dataset. The elements of the graph for the graph-based representation of the dataset may include vertices, edges, and properties, where the properties may be properties of vertices or properties of edges. For example, the dataset to be represented by the graph database may be data of a communication network (e.g., topology of the communication network), data of a social network (e.g., the members of the social network and associated relationships or potential relationships between the members of the social network), and so forth. In an example where the graph database is used to provide a graph-based representation of a communication network, the devices of the communication network may be represented using vertices of the graph, the communication links or paths of the communication network may be represented using edges of the graph, and various attributes of the devices and communication links or paths of the communication network may be represented using properties of the graph. For example, where the graph database is used to provide a graph-based representation of a social network, the members of the social network may be represented using vertices of the graph, the relationships or potential relationships between the members of the social network may be represented using edges of the graph, and various attributes of the members and relationships or potential relationships of the social network may be represented using properties of the graph. It will be appreciated that the environment for which the dataset is provided may itself be a graph (e.g., the underlying communication networks, social networks, and so forth may be considered to be graphs, which may make the associated datasets particularly well-suited for representation using a graph database) and, thus, that the environment for which the dataset is provided also may be referred to herein as a graph in at least some examples. It will be appreciated that, although primarily presented herein with respect to use of graph databases to represent and store information of a communication network, various examples presented herein may be applied where graph databases are used to represent and store information of various other environments or contexts.

In one example, as indicated above, the A&AI system 150 may represent and store the network state information of the network in a graph database for the network. The graph database for the network represents and stores the network state information of the network using a graph, such that the graph may be considered to provide a representation of the network state information of the network and, thus, also comprises a representation of the network. The network state information for the network includes state information for various elements of the network (e.g., communication nodes, communication links and paths, relationships between communication nodes, relationships between communication nodes and communication paths, attributes of communication nodes, attributes of communication links and paths, and so forth), which may be represented and stored within the graph database using elements of the graph database which provide the graph-based representation of the network state information of the network (namely, vertices, edges, and properties of the graph which may be used to represent and store the network state information of the network). The graph database for the network may be updated with network state information of the network in real-time or near real-time and, thus, the graph database for the network also or alternatively may be referred to as a real-time graph database for the network. In one example, the graph database for the network may be updated with network state information based on processing of events of an event stream, where the events of the event stream may be indicative of management actions performed on the network (e.g., CRUD operations initiated on the network manually by users, automatically by devices, and so forth). It will be appreciated that since the network state information of the network may be represented and stored based on a graph, references herein to storage of network state information for the network in the graph database also may be considered to be references to storage of graph state information (network state information) for the graph (which represents the network state information of the network and, thus, which also may be considered to represent the network).

In one example, the network state information of the network may be maintained within the graph database as graph state information that represents the network state information. In one example, the network state information may be maintained within the graph database as element state information for various elements of the network (e.g., communication nodes, attributes of communication nodes, communication links or paths, attributes of communication links or paths, relationships between communication nodes, relationships between communication nodes and communication links or paths, communication services, attributes of communication services, relationships between communication services and communication nodes, relationships between communication services and communication links or paths, and so forth), and the element state information may be considered to form at least a part of the graph state information of the graph database. The element state information may include, for each of the various elements of the network, respective element state information. For example, the element state information may include node state information for various communication nodes of the network (e.g., overall node state information, node attribute state information, and so forth), state information related to network connectivity for communication links or paths between communication nodes of the network, service state information for communication services supported by the network, and so forth. For example, for a communication node, the element state information for the communication node may include an indication of an existence of the communication node (e.g., which may simply be an indication that the communication node exists and that does not necessarily have any specific value assigned thereto), a node name of the communication node, a node identifier of the communication node, an operational status of the communication node, a list of communication links or paths connected to the communication node, a list of services supported by the communication node, and so forth. Similarly, for a communication link, the element state information may include an indication of an existence of the communication link (e.g., which may simply be an indication that the communication link exists and that does not necessarily have any specific value assigned thereto), a link identifier of the communication link, an operational status of the communication link, a pair of node identifiers of the communication nodes to which endpoints of the communication link are connected, a list of communication services supported by the communication link, and so forth. Accordingly, it will be appreciated that the element state information for an element may include a label for the element (e.g., NODE-123, which may not have any other value assigned thereto) or may include a value assigned to a label for the element (e.g., IP address: aaa.aaa.aaa.aaa, where "IP address" is a label for the element state information which is actually the value of "aaa.aaa.aaa.aaa"). It will be appreciated that in the graph-based representation of such network state information in the graph database, the elements that comprise labels may be mapped to vertices of the graph (e.g., a communication node identified as NODE-123 may be a vertex of the graph) or edges of the graph (e.g., a communication link identified as LINK-ABC may be a edge of the graph) and the elements that comprise values associated with labels may be mapped to properties of the graph (e.g., IP address: aaa.aaa.aaa.aaa may be a property associated with a vertex or an edge), although it will be appreciated that other mappings may be used). It is noted that the types of element state information maintained for the elements of the network may vary across element types, network types, and so forth. It will be appreciated that the element state information may be considered to be an element-based representation of the network state information.

In one example, the network state information of the network may be maintained within the graph database based on construction of the graph database in accordance with a schema, e.g., a set of rules regarding the types of vertices in the graph database, the types of edges in the graph database, the types of properties of vertices and edges in the graph database, the manner in which the graph elements of the graph database may be arranged, the manner in which the network state information of the network (in the form of element state information) may be mapped to the graph elements of the graph database, and so forth. The schema may also be defined to imply a hierarchy of nodes of the network. For instance, nodes may be arranged in layers/levels, such as cloud regions, rack tenants, physical servers, and virtual processing resources (e.g., virtual machines (VMs), virtual containers (VCs), and so forth) which may be configured to support various functions (e.g., VNFs), where rack tenants may be child nodes of cloud regions, physical servers may be child nodes of rack tenants, virtual processing resources may be child nodes of physical servers, and so forth. It will be appreciated that the network state information of the network may be maintained within the graph database as graph state information based on construction of the graph database in various other ways (e.g., based on other organizational structures, schemas, rules, and so forth).

In one example, the A&AI system 150 may represent and store network state information of the network in an historical graph database for the network. The historical graph database for the network represents and stores network state information of the network (e.g., current network state information, previous network state information, and so forth) using a graph, such that the graph may be considered to provide a representation of the network state information of the network and, thus, also a representation of the network. The historical graph database stores historical graph state information for the network that is based on the graph state information of the network that is stored in the graph database for the network. More specifically, the historical graph database, like the graph database, stores element state information for elements of the network while also including corresponding state version tracking information for the element state information for the elements of the network, where such state version tracking information for the element state information may be used to support historical state management for the network (and, thus, for the associated graph database of the network). The state version tracking information for element state information for the elements of the network may include various types of information which may be used for historical state management functions, such as: timestamp information related to the element state information for an element of the network (e.g., start timestamp (start-TS) information which may be indicative of a time of creation or updating of the element, end timestamp (end-TS) information which may be indicative of a time of deletion of the element, and so forth), source of truth (SOT) information related to the element state information for the element of the network (e.g., start-SOT information which may be indicative of the entity (e.g., system, device, person, or the like) which authorized or performed the creation or updating of the element, and end-SOT information which may be indicative of the entity (e.g., system, device, person, or the like) which authorized or performed the deletion of the element), and so forth. Similarly, the state version tracking information for element state information for the elements of the network may include start of lifecycle information for a lifecycle of an element of the network (e.g., information which may be related to creation or updating of the element, such as start-TS, start-SOT, and so forth), end of lifecycle information for a lifecycle of the element of the network (e.g., information which may be related to deletion of the element, such as end-TS, end-SOT, and so forth), and so forth. It will be appreciated that various other types of state version tracking information may be used for tracking the element state information for the elements of the network. It is noted that the state version tracking information also may be referred to herein as temporal metadata (or, more generally, metadata), time series data, and so forth. It will be appreciated that since the network state information of the network may be represented and stored based on a graph, references herein to storage of network state information for the network in the historical graph database also may be considered to be references to storage of historical graph state information (network state information) for the graph (which represents the network state information of the network and, thus, which also may be considered to represent the network). It is noted that the historical graph state information maintained within the historical graph database, like the graph state information maintained within the graph database, may be maintained based on construction of the historical graph database in accordance with a schema (e.g., the schema of the historical graph database may be considered to be a relaxed version of the schema of the graph database).

The A&AI system 150 may provide and maintain the historical graph database in various ways. For example, the A&AI system 150 may provide and maintain the historical graph database by receiving and processing an event stream including events indicative of modifications (e.g., CRUD modifications) to the network (e.g., addition of new nodes, reconfiguration of existing nodes, termination of existing nodes, addition of new links, modification of existing links, termination of existing links, and so forth). This may be performed without frontloading the historical graph database with a snapshot of the graph database, such that the historical graph database is built over time as the event stream is received and processed. It is noted that such CRUD operations performed on the network also may be referred to herein as being "assertions" on the network (or assertions on the graph representing the network). It is noted that various aspects related to providing the historical graph database based on processing of an event stream may be further understood from the examples of FIG. 2 and FIG. 3.

In one example, the A&AI system 150 may provide and maintain the historical graph database by generating the historical graph database from the graph database (e.g., by frontloading the historical graph database with a snapshot of the graph database) and updating the historical graph database based on processing of an event stream that includes events indicative of modifications (e.g., CRUD modifications) to the network (e.g., addition of new nodes, reconfiguration of existing nodes, termination of existing nodes, addition of new links, modification of existing links, termination of existing links, and so forth). In one example, the A&AI system 150 may generate the historical graph database from the graph database by copying the graph database to form a graph database copy and augmenting the graph database copy with state version tracking information to form the historical graph database. It is noted that various aspects related to providing the historical graph database by generating the historical graph database and updating the historical graph database based on processing of an event stream may be further understood from the examples of FIG. 2 and FIG. 3.

In one example, as discussed above, the A&AI system 150 may update the historical graph database based on changes to the network (and, thus, changes to the graph of the graph database that is being used to represent and store the network state information of the network). In one example, as discussed above, the A&AI system 150 may update the historical graph database based on processing of events of an event stream indicative of various management actions (e.g., modifications, such as CRUD operations) performed on the network. The event stream of events indicative of modifications to the network may be a copy of the event stream provided to the network for modifying the network. The event stream may be a copy of the event stream provided to the graph database for the network based on the modifications to the network. In one example, for a received event associated with an element of the historical graph database (e.g., a management action performed for an element of the network represented by an element of the historical graph database and, thus, associated with the element of the historical graph database), the updating of the historical graph database based on the event may include storing the element state information of the element (e.g., the element state information for the management action performed for the network) as well as the state version tracking information of the element (e.g., lifecycle start information, lifecycle end information, and so forth, where, as discussed further herein, the type of state version tracking information that is stored may depend on the type of management action performed for the element of the network). The updating of the historical graph database based on processing of an event stream may be further understood from the examples of FIG. 2 and FIG. 3.

For example, where the event is a create action for creating a new element in the network (and, thus, in the graph), the updating of the historical graph database may include creating a new element in the historical graph database representing the new element in the graph and setting state version tracking information for that element in the historical graph database. In one example, the creation of the new element in the historical graph database may include creating the new element and storing element state information for the new element (e.g., node identifier and operational status information for a new node, link endpoint and operational status information for a new link, attribute values for new attributes, and so forth), where it will be appreciated that the element state information for the new element may depend on the element type of the new element (e.g., node, link, attribute, relationship, or the like). In one example, the setting of the state version tracking information may include setting a start-TS indicative of a start time for the create action (e.g., the time at which the create action was approved, sent, effected in the graph, or the like) and a start-SOT indicative of an entity that authorized or performed the create action (e.g., the SDN controller 155, another network device or management system, a network technician, etc.).

For example, where the event is an update action for updating an existing element in the network (and, thus, in the graph), the updating of the historical graph database may include updating the element in the historical graph database representing the existing element in the graph and updating state version tracking information for that element in the historical graph database. In one example, the updating of the existing element in the historical graph database may include updating the element state information for the existing element (e.g., changing an operational status of a node or link, changing an IP address of a node, changing path connectivity information of a path, adding new configuration information associated with the existing element, removing existing configuration information associated with the existing element, or the like), where it will be appreciated that the element state information for the existing element may depend on the element type of the existing element (e.g., node, link, attribute, relationship, or the like). In one example, the updating of the state version tracking information may include modifying the start-TS of the existing element (e.g., to a time indicative of a start time for the update action (e.g., the time at which update action was approved, sent, effected in the graph, or the like)) and the start-SOT of the existing element (e.g., indicative of an entity that authorized or performed the update action (e.g., the SDN controller 155, another network device or management system, a network technician, etc.)).

In an example where the event is a delete action for deleting an existing element from the network (and, thus, from the graph), the updating of the historical graph database may include updating state version tracking information for that element in the historical graph database. In one example, the updating of the state version tracking information may include setting the end-TS of the existing element (e.g., to a time indicative of a time for the delete action (e.g., the time at which the delete action was approved, sent, effected in the graph, or the like), which may be indicative of the end of the lifecycle of the element) and the end-SOT of the existing element (e.g., indicative of an entity that authorized or performed the delete action (e.g., the SDN controller 155, another network device or management system, a network technician, etc.)). It will be appreciated that the delete action may or may not trigger updating of the element state information for the element in the historical graph database, i.e., the element state information for the existing element may not be updated (e.g., since the element is being deleted from the graph and, thus, from the historical graph database) or may be updated (e.g., to provide a record of the reason for the deletion or to preserve information indicative of any changes made to the element state information of the element of the graph).

In one example, the A&AI system 150 may perform a state resolution process. For instance, the state resolution process may ensure that elements are added to the historical graph database in an order that prevents or at least tends to prevent problems with storing and maintaining information in the historical graph database. It will be appreciated that ordering of elements may be enforced for various numbers of elements, groups of elements, and so forth. For example, in the case of a communication network, it may be necessary or desirable to add two elements to the historical graph database representing two routers of the network before adding an element representing a communication link between the two routers (e.g., so that the description of the communication link can reference the two routers between which the communication link is configured). It will be appreciated that the state resolution process may be utilized during an initial construction of the historical graph database (e.g., where the historical graph database is formed by copying element state information of the graph database to provide the historical element state information of the historical graph database), in conjunction with handling of the event stream for updating the historical graph database based on changes to the underlying graph, and so forth.

In one example, the state resolution process may include receiving a first event associated with a first element (e.g. a new element to be added to the historical graph database, an existing element of the historical graph database, or the like), performing a determination as to whether the first element has a dependency on a second element (e.g. a new element to be added to the historical graph database, an existing element of the historical graph database, or the like) associated with a second event, and handling the first event based on the determination as to whether the first element has a dependency on the second element. It will be appreciated that this may be useful where it is possible that the first event associated with the first element and the second event associated with the second element may be received out of order even though there is a dependency between the first element and the second element.

In one example, if the first element does not have a dependency on the second element, then the first event associated with the first element may be processed without waiting for receipt of the second event associated with the second element.

In one example, if the first element does have a dependency on the second element, then processing of the first event associated with the first element may be delayed until the second event associated with the second element is received and processed. It will be appreciated that the processing of the first event associated with the first element may be delayed in various ways (e.g., by storing the first event associated with the first element in a manner that enables the first event associated with the first element to be identified and processed based on a determination that the second event associated with the second element has been received and processed). The first event associated with the first element may then be processed based on a determination that the second event associated with the second element has been received and processed. It will be appreciated that operation of the state resolution process in this manner ensures that the processing of events proceeds in an order preventing or at least tending to prevent problems with constructing and maintaining the historical graph database.

In one example, if the first element does have a dependency on the second element, then processing of the first event associated with the first element may be performed, even though the second event associated with the second element has not yet been received, by updating the historical graph database to include a placeholder for the second element associated with the second event and processing the first event associated with the first element. It will be appreciated that the placeholder may be a vertex (e.g., where the second element is a new node to be added to the historical graph database), an edge (e.g., where the second element is a new communication link or communication path to be added to the historical graph database), a property (e.g., where the second element is an attribute to be added to or updated within the historical graph database), and so forth. The second event associated with the second element may then be processed upon being received (e.g., by replacing the placeholder with the second element, by updating the placeholder to become the second element, and so forth). It will be appreciated that operation of the state resolution process in this manner ensures that events received out of order may be processed as the events are received (e.g., without having to delay processing of out-of-order events), thereby preventing or at least tending to prevent problems with constructing and maintaining the historical graph database. It will be appreciated that various aspects of the state resolution process may be further understood from the following examples.

To further illustrate, in one example, it may be assumed that the first element is a property representing an attribute of a network device of the communication network and the second element is a node representing that network device. In such an example, there is a dependency between the first element and the second element, since the node representing the network device will need to exist within the historical graph database before the property representing the attribute of the network device can be associated with the node representing the network device. In this example, it is assumed that a first event indicative that the first element is to be added to the historical graph database is received before a second event indicative that the second element is to be added to the historical graph database. Accordingly, in one example, the state resolution process, upon receiving the first event indicative that the property representing the attribute of the network device that is to be added to the historical graph database, may determine that the first event has been received before the node representing that network device of the communication network has been added to the historical graph database and, thus, may delay processing of the first event. In addition, the state resolution process may continue to monitor for the second event indicative that the node representing the network device of the communication network is to be added to the historical graph database. The state resolution process, after receiving and processing the second event to add a node representing that network device to the historical graph database, will then process the first event indicative that the property representing the attribute of the network device is to be added to the historical graph database. As a result, the element (e.g., a node or vertex) representing the network device is added to the historical graph database before the element representing the attribute of the network device is added to the historical graph database, such that an error is not encountered when the element representing the attribute of the network device of the communication network is added to the historical graph database.

To further illustrate, in another example, it may be assumed that the first element is a first property representing a first attribute of a communication link of the communication network and the second element is a second property representing a second attribute of that communication link. In such an example, there is a dependency between the first element and the second element, since the second property representing the second attribute of the communication link will need to exist within the historical graph database before the first property representing the first attribute of the communication link can be associated with the edge representing the communication link within the historical graph database. In this example, it is assumed that a first event indicative of setting of the first attribute is received before a second event indicative of setting of the second attribute. Accordingly, in one example, the state resolution process, upon receiving the first event indicative of setting of that the first property representing the first attribute of the communication link, may determine that the first event has been received before the second property representing the second attribute of the communication link has been added to the historical graph database and, thus, may support processing of the first event before the second event is received by updating the historical graph database to include a placeholder for second property representing the second attribute of the communication link and then processing the first event based on the placeholder for the second property. The state resolution process, after receiving and processing the first event to add the first property representing the first attribute of the communication link to the historical graph database based on the placeholder for the second property, may later receive and process the second event indicative of setting of the second attribute (e.g. by replacing the placeholder for the second property with the second property based on processing of the second event to add the second property to the historical graph database). As a result, the element (e.g., property) representing the first attribute of the communication link is added to the historical graph database before the element representing the second attribute of the communication link is added to the historical graph database without an error being encountered even though the element representing the first attribute of the communication link is dependent on the element representing the second attribute of the communication link.

In one example, the A&AI system 150, in addition to constructing and maintaining such an historical graph database, may also support handling of client queries on the historical graph database. To illustrate, the A&AI system 150 may receive a client query requesting information, obtain the requested information, and provide a query response including the requested information. In one example, clients from which client queries may be initiated may include user devices, such as smartphones, personal computers, cloud-based user desktop applications, and so forth. For example, a user, such as a network operations technician, may initiate a query via user device 141. In one example, clients from which client queries may be initiated may also include network devices (e.g., physical devices or services/applications running on physical devices), such as a network provisioning system, a network management system, a network security system, a billing system, and so forth. For example, an automated component of network 105, such as SDN controller 155, may initiate a query. It will be appreciated that the clients, upon receiving the requested information provided in the query responses, may handle the received information in various ways (e.g., storing, presenting, processing, and so forth).

In one example, the inclusion of the state version tracking information within the historical graph database enables support for various query operations, including various enhanced query operations. This provides a capability to quickly and efficiently revisit the state of the real-time graph at various granularities (e.g., for individual elements, combinations of elements, the entire real-time graph, and so forth) and various time scales (e.g., at particular points in time, for particular ranges of time, and so forth), thereby enabling support for various management actions, including various enhanced management actions such as investigation of past issues, restoration to previous states, and so forth. This enables various stakeholders associated with the real-time graph to obtain in-depth knowledge of the full lifecycle of the real-time graph, monitor various aspects of the real-time graph over time, and so forth. In the case of management of a communication network, for example, this enables various stakeholders to understand how the communication network is being constructed, determine if the construction of the network is proper, determine if inventory systems reflect what is truly deployed in the network, audit the source of truth clients providing the network topology information to the inventory system, and so forth.

It should be noted that the system 100 has been simplified. In other words, the system 100 may be implemented in a different form than that illustrated in FIG. 1. For example, the system 100 may be expanded to include additional networks (e.g., a content distribution network (CDN), a network operations center (NOC) network, and the like), additional network devices (e.g., border devices, routers, switches, policy servers, security devices, gateways, and the like), and so forth, without altering the scope of the present disclosure. In addition, system 100 may be altered to omit various elements, substitute elements for devices that perform the same or similar functions and/or combine elements that are illustrated as separate devices. For example, SDN controller 155, A&AI system 150, and/or other network devices may include functions that are spread across several devices that operate collectively as a SDN controller, an A&AI system, an edge device, and so forth. Thus, these and other modifications of the system 100 are all contemplated within the scope of the present disclosure.

It will be appreciated that while various examples are described herein in connection with an A&AI system that supports a graph database storing graph information of a graph that provides a graph-based representation of a particular dataset for a particular type of system (namely, topology data of a communication network), various principles set forth herein may be applied to various types of systems supporting graph databases storing graph information of graphs that provide graph-based representations of various other datasets for various other types of systems, such as a transportation system, an environmental ecosystem, organizational structure information, an entity relationship management system, a social network, and so forth.

Figure 2:
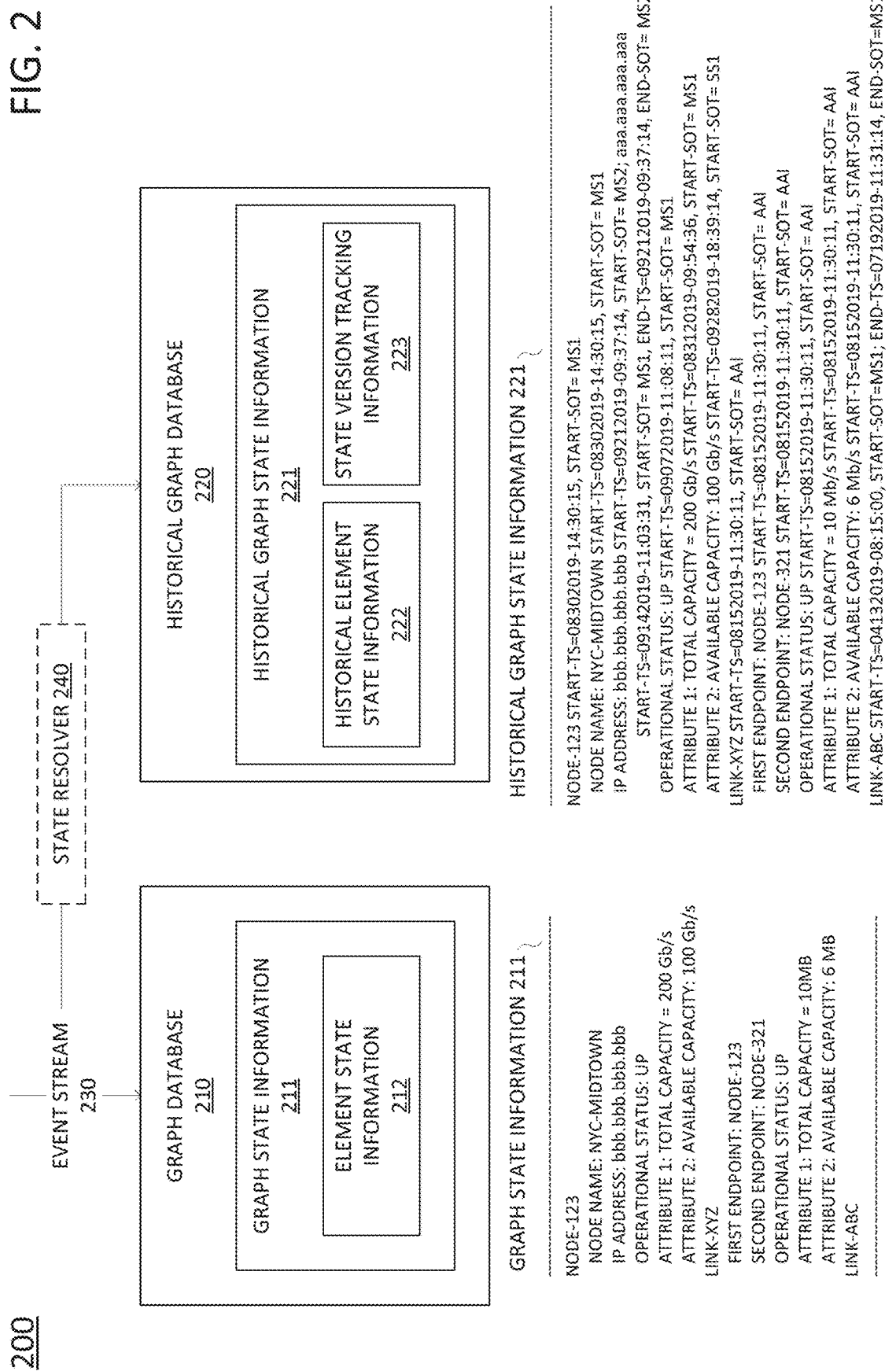
FIG. 2 illustrates an example process of providing an historical graph database for a network.

FIG. 2 illustrates an example process 200 of providing an historical graph database for a graph. In the example process 200, a graph database 210 and an historical graph database 220 are provided for a dataset of an underlying system (e.g., in the example of FIG. 2, topology data of a communication network), and the graph database 210 and the historical graph database 220 are updated based on an event stream 230 including events indicative of changes to the dataset of the underlying system (e.g., in the example of FIG. 2, changes to the topology data of a communication network based on configuration and reconfiguration of the communication network).

In the example process 200, the graph database 210 stores graph state information 211 for a graph including a set of elements (e.g., components of a network, such as nodes, links, attributes, relationships, and so forth, where the graph is a network). The graph state information 211 includes element state information 212 for the elements of the graph. The element state information 212 includes, for each of the elements of the graph, respective element state information for the respective element of the graph. Here, it will be appreciated that the elements of the graph may be considered to be the graph elements of the graph that are used to provide the corresponding graph-based representation of the associated elements of the network represented and stored in the graph database 210 (e.g., a vertex representing a communication node, an edge representing a communication link or path, a property representing an attribute of a communication node, or the like), the elements of the network represented and stored in the graph database 210 using the graph-based representation (e.g., a communication node represented by a vertex, a communication link or path represented by an edge, an attribute of a communication link or path represented by a property, or the like), and so forth.

It is noted that an example of graph state information 211, including element state information 212 for elements of a network, is illustrated in FIG. 2. For example, as illustrated in FIG. 2, the element state information 212 relates to three high level elements (NODE-123, LINK-XYZ, and LINK-ABC) as well as additional elements related to two of the high-level elements (e.g., elements such as node name, IP address, operational status and attributes for the NODE-123 element and elements such as endpoints, operational status, and attributes for the LINK-XYZ element). It will be appreciated that the element state information 212 for a network may include various other types of information for the network elements, that the element state information 212 may include various other types of information for other types of graphs, and so forth. It will be appreciated that the formatting of the examples of the graph state information 211 in FIG. 2 is merely one type of formatting that may be used and that the graph state information 211 may be formatted in various other ways.

In the example process 200, the historical graph database 220 may be provided by generating the historical graph database 220 from the graph database 210, building the historical graph database 220 from the event stream 230, and so forth. In one example, the historical graph database 220 may be generated from the graph database 210 by copying the graph database 210 (e.g., copying the element state information 212 from the graph database 210 and storing it in the historical graph database 220 as historical element state information 222) and augmenting the historical element state information 222 with associated state version tracking information 223 to provide thereby historical graph state information 221 that provides an historical representation of the graph state information 211 of the graph database 210. The historical element state information 222 includes, for each of the elements of the graph, respective element state information for the respective element of the graph. The state version tracking information 223 includes, for each of the elements of the graph, respective state version tracking information for the respective element of the graph. The historical graph state information 221 includes, for each of the elements of the graph, the respective element state information 222 for the respective element (copied from the respective element state information 212 in the graph state information 211 of the graph database 210) and the respective state version tracking information 223 for the respective element (added to the respective element state information copied from the element state information 212 of the graph database 210). As discussed herein, the state version tracking information 223 that is associated with the historical element state information 222 to form the historical graph state information 221 may include TS information (e.g., start-TS, end-TS, and so forth), SOT information (e.g., start-SOT, end-SOT, and so forth), and the like.

It is noted that an example of historical graph state information 221, including historical element state information 222 and state version tracking information 223 for elements of a network, is illustrated in FIG. 2. The historical element state information 222 is nearly identical to the element state information 212 of the graph database 210 (e.g., the NODE-123 element and associated elements, the LINK-XYZ element and associated elements, and so forth), since it is assumed that the element state information 212 of the graph database 210 was copied to provide the historical element state information 222 for the historical graph database 220. The historical element state information 222 has been augmented with state version tracking information 223 that includes, for element of the historical element state information 222, TS information and SOT information for the respective element. In this example, it is assumed that at the time of copying the element state information 212 to provide the historical element state information 222, actual state version tracking information could be reliably determined for the NODE-123 element and each of its associated elements (e.g., start-TS and start-SOT) as well as for the LINK-ABC element (e.g., end-TS and end-SOT), but that actual state version tracking information could not be determined for the LINK-XYZ element and each of its associated elements and, thus, that generated state version tracking information was fabricated for the LINK-XYZ element and each of its associated elements so as to provide the state version tracking information for the LINK-XYZ element and each of its associated elements. The actual state version tracking information and generated state version tracking information for the example of FIG. 2 are discussed further below.

For example, as illustrated in FIG. 2, the state version tracking information for the NODE-123 element and each of its associated elements includes actual state version tracking information. The NODE-123 element includes a START-TS of 08302019-14:30:15 and a START-SOT of "MS1", which indicates that the creation of the NODE-123 element in the graph took place on Aug. 30, 2019 at the indicated time and that the create operation was performed by a management system identified as MS1. The state version tracking information for the NODE NAME element is identical to the state version tracking information for the NODE-123 element, indicating that this element also was created at the time that the NODE-123 element was created. However, the state version tracking information for the OPERATIONAL STATUS element indicates a later date and time for this element, which may indicate that the OPERATIONAL STATUS element was updated from DOWN to UP after NODE-123 element was created (e.g., if the node was down and came back up). Similarly, the state version tracking information for the ATTRIBUTE 1 and ATTRIBUTE 2 elements indicates a later date and time for these elements, which may indicate that these elements were created, reconfigured, or updated at some time after the NODE-123 element was created (e.g., during a configuration or reconfiguration of NODE-123, responsive to a condition or action, and so forth).

As further illustrated in FIG. 2, the state version tracking information for the LINK-XYZ element and each of its associated elements includes generated state version tracking information (e.g., fabricated since actual state version tracking information for these elements could not be determined at the time at which the element state information 212 of the graph database 210 was copied to initially provide the historical element state information 222 for the historical graph database 220). The LINK-XYZ element includes a START-TS of 08152019-11:30:11 (which represents the time at which the element state information 212 of the graph database 210 was copied to initially provide the historical element state information 222 for the historical graph database 220) and a START-SOT of "AAI" (which identifies the system, e.g., A&AI system 150, that copied the element state information 212 of the graph database 210 to initially provide the historical element state information 222 for the historical graph database 220). Similarly, each of the elements associated with the LINK-XYZ element also includes a START-TS of 08152019-11:30:11 and a START-SOT of "AAI" since actual state version tracking information also could not be determined for these elements at the time at which the element state information 212 of the graph database 210 was copied to initially provide the historical element state information 222 for the historical graph database 220.

FIG. 2 further illustrates that the state version tracking information for the LINK-ABC element includes actual state version tracking information. The LINK-ABC element includes a START-TS of 04132019-08:15:00 and a START-SOT of "MS1", which indicates that the creation of the LINK-ABC element in the graph took place on Apr. 13, 2019 at the indicated time and that the create operation was performed by a management system identified as MS1. The LINK-ABC element also includes an END-TS of 07282019-09:13:46 and an END-SOT of "MS1", which indicates that the deletion of the LINK-ABC element from the graph took place on Jul. 28, 2019 at the indicated time and that the delete operation was performed by the management system identified as MS1. It will be appreciated that the formatting of the examples of the historical graph state information 221 in FIG. 2 is merely one type of formatting that may be used and that the historical graph state information 221 may be formatted in various other ways.

In the example process 200, the network (and, thus, the graph representing the network) changes over time (e.g., based on CRUD operations on the network, such as addition of new elements, modification of existing elements, deletion of existing elements, and so forth). The changes to the network over time are represented by the event stream 230 depicted in FIG. 2. The event stream 230 may identify and describe the changes to the network over time (e.g., each event of the event stream 230 may identify and describe one or more CRUD operations made to the network and, thus, to the graph that represents the network state information of the network and, thus, the network). The events of the event stream 230 may be the changes provided to the network (e.g., the actual operations provided to the network to modify the network are captured and provided as the event stream 230) or may be generated based on the changes provided to the network (e.g., representations or descriptions of the actual operations to modify the network are generated and provided as the event stream 230).

The changes to the network as represented by the event stream 230 are reflected in the graph database 210 (indicated in FIG. 2 by a flow of the event stream 230 to the graph database 210) so that the graph database 210 continues to maintain an accurate representation of the network over time (e.g., the element state information 212 for the graph that is maintained in the graph database 210 and, thus, the graph state information 211 for the graph that is maintained in the graph database 210, is updated over time based on the changes to the network over time (e.g., as indicated by the event stream 230)).

Similarly, the changes to the network as represented by the event stream 230 are reflected in the historical graph database 220 (indicated in FIG. 2 by a flow of the event stream 230 to the historical graph database 210) so that the historical graph database 220 continues to maintain an accurate representation of the graph database 210 (and, thus, the network represented by the graph of the graph database 210) over time. In addition, the events of the event stream 230 are processed to provide updated historical element state information 222 and updated state version tracking information 223 and, thus, updated historical graph state information 221 based on the changes to the network as indicated by the event stream 230.

In the example process 200, a state resolver 240 may be used to process the event stream 230 for the historical graph database 220. The state resolver 240 may be configured to ensure that elements are added to the historical graph database 220 in an order that prevents or at least tends to prevent problems with storing and maintaining information in the historical graph database 220. The state resolver 240 may be configured to receive, via the event stream 230, a first event associated with a first element, perform a determination as to whether the first element has a dependency on a second element associated with a second event, and handle the first event associated with the first element based on the determination as to whether the first element has a dependency on the second element. In one example, the state resolver 240, based on a determination that the first element does not have a dependency on the second element, processes the first event without waiting for the second event to be received and processed. In one example, the state resolver 240, based a determination that the first element does have a dependency on the second element, may handle the first event in various ways (e.g., delaying processing of the first event until the state resolver 240 receives and processes the second event, updating the historical graph database 220 to include a placeholder for the second element associated with the second event and processing the first event based on the placeholder for the second element, and so forth). In this manner, the state resolver 240 ensures that the processing of events of the event stream 230 for building and maintaining the historical graph database 220 proceeds in a manner preventing, or at least tending to prevent, problems with building and maintaining the historical graph database 220.

It will be appreciated that, although primarily presented herein with respect to examples in which, for each element, the historical graph state information includes a single set of state information for the element (e.g., one set of historical element state information and associated state version tracking information for the element, corresponding to the current element state information and associated state version tracking information for the element), the historical graph state information may include, for one or more of the elements, multiple sets of state information for the given element (e.g., multiple sets of historical element state information and associated state version tracking information for the element), respectively. This may be useful for tracking changes to the historical element state information of the element over time, which may be particularly useful for elements for which the associated historical element state information of the element is expected to change relatively frequently. For example, where the element corresponds to a property of a device in a communication network, such as an IP address of the device, each of the IP addresses assigned to the device, as well as details related to the changes to the IP address over time (e.g., timestamp and source of truth information), may be tracked over time using multiple sets of state information for the element corresponding to the IP address of the device. For example, as illustrated in FIG. 2, where the IP address is set to aaa.aaa.aaa.aaa by a first management system (MS1) on Sep. 14, 2019 at 11:03:31 AM and is then changed to bbb.bbb.bbb.bbb by a second management system (MS2) on Sep. 21, 2019 at 09:37:14 AM, the historical element state information that is maintained for the element corresponding to the IP address of the device (namely, IP ADDRESS) may be set as "IP ADDRESS: bbb.bbb.bbb.bbb START-TS=09212019-09:37:14, START-SOT=MS2; aaa.aaa.aaa.aaa START-TS=09142019-11:03:31, START-SOT=MS1, END-TS=09212019-09:37:14, END-SOT=MS2. In this example, it may be seen that the end of lifecycle information (i.e., end-TS and end-SOT) for the first IP address of the device is the same as the start of lifecycle information (e.g., start-TS and start-SOT) for the second IP address of the device since the updating of the IP address from aaa.aaa.aaa.aaa to bbb.bbb.bbb.bbb was the end of the lifecycle of the aaa.aaa.aaa.aaa IP address and the start of the lifecycle of the bbb.bbb.bbb.bbb IP address. It will be appreciated that the retention of the earlier value of the IP address, and the associated state version tracking information (e.g., TS and SOT) for the earlier value of the IP address, will preserve that information for use in answering queries related to the period of time in which the IP address of the device was set to the aaa.aaa.aaa.aaa IP address. It will be appreciated that the multiple sets of state information for a given element may be maintained as part of the historical graph state information in various ways (e.g., as a string of data, using structuring of data such that each set of state information is maintained as a sub-element of the element to which it applies, and so forth). It will also be appreciated that, where multiple sets of state information are available for one or more elements, the multiple sets of state information may be used to handle queries on the historical graph database. In one example, the present disclosure may also handle large volumes of data in the historical graph database 220 by partitioning the historical graph database by temporal epochs, e.g., partitions corresponding to hours, days, weeks, etc. In such case, a query that relates to one or more epochs may be processed in accordance with historical graph state information 221 from the relevant partition(s).

Figure 3:
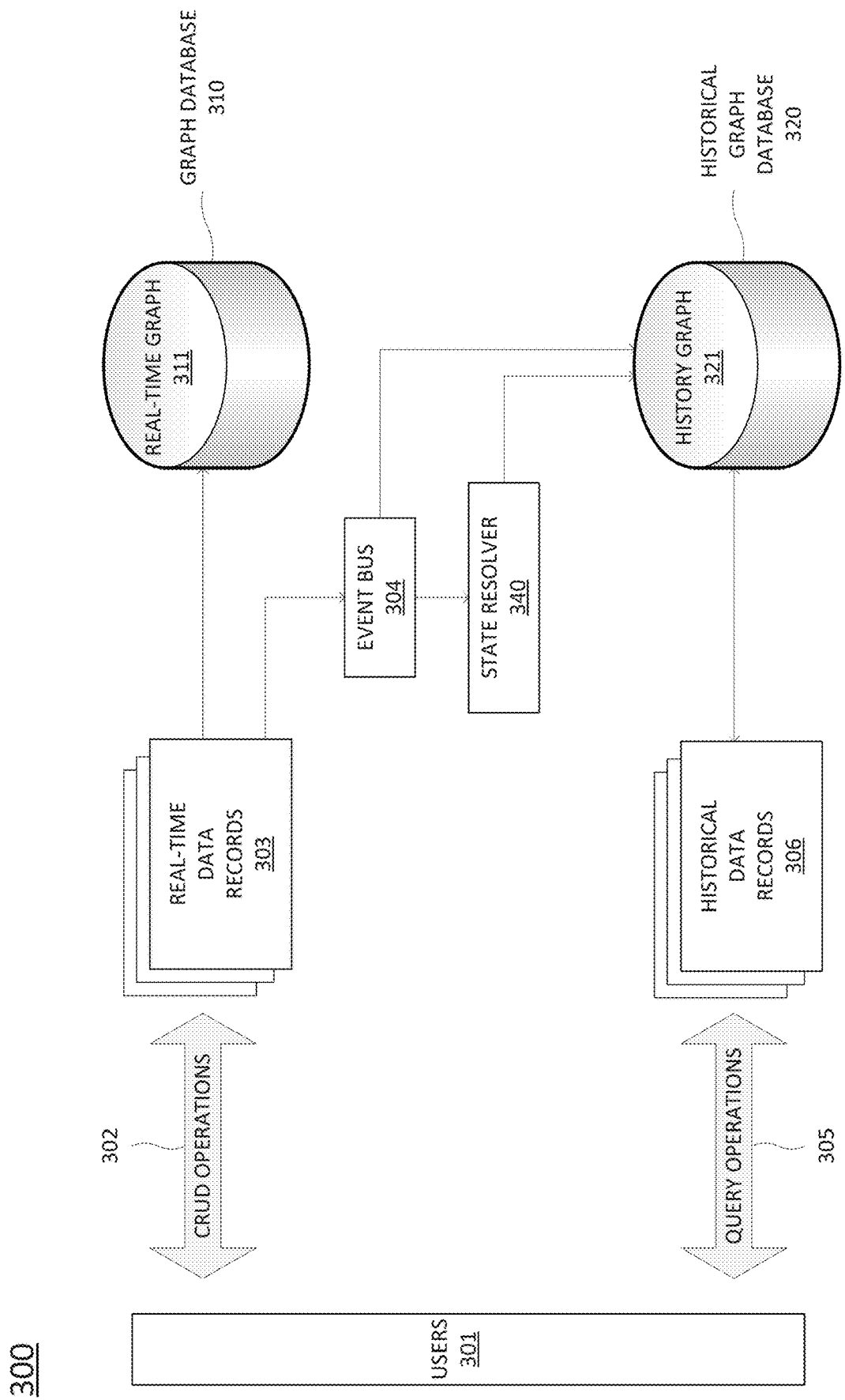
FIG. 3 illustrates an example process of providing an historical graph database for a network and using the historical graph database to handle queries for information about the network.

FIG. 3 illustrates an example process of providing an historical graph database for a graph and using the historical graph database to handle queries for information about the graph. In the example process 300, a set of users 301 may be enabled to manage a dataset or system (e.g., a network or data describing the network) which may be represented as a real-time graph 311 in a graph database 310 and as a history graph 321 in an historical graph database 320. The set of users 301 may be enabled to manage the dataset or system using various systems and devices, such as using user terminals associated with a management system (e.g., using a graphical user interface (GUI) of a management application, using a command line interface (CLI) available from the management system, and the like), using end user devices running management applications, and so forth.

In the example process 300, the users 301 may initiate a set of CRUD operations 302. The CRUD operations 302 may correspond to management actions performed for the underlying dataset or system represented by the real-time graph 311 of the graph database 310. The execution of the CRUD operations 302 results in creation of a set of real-time data records 303. It will be appreciated that the real-time data records 303 may be considered to be events of an event stream, where the events are indicative of management actions performed for the underlying dataset or system represented by the real-time graph 311 of the graph database 310 and, thus, are indicative of management actions performed for the real-time graph 311 of the graph database 310. These events are to be reflected in the real-time graph 311 of the graph database 310 as well as in the history graph 321 of the historical graph database 320.

In the example process 300, the real-time data records 303 are provided to the graph database 310 (e.g., for updating the real-time graph 311 of the graph database 310 to reflect the information in the real-time data records 303 and, thus, to reflect the state of the underlying dataset or system represented by the real-time graph 311 of the graph database 310). The real-time data records 303 are also provided to an event bus 304 that is configured to feed the real-time data records 303 to the historical graph database 320 (e.g., for updating the history graph 321 of the historical graph database 320 to reflect the information in the real-time data records 303). The event bus 304 may be configured to provide the real-time data records 303 to the historical graph database 320 based on a subscription to the event bus 304. The event bus 304 may be a message bus or other type of bus suitable for enabling the real-time data records 303 resulting from the CRUD operations 302 to be provided to the historical graph database 320.

In the example process 300, the real-time data records 303 may be provided to the historical graph database 320 directly and/or may be provided to historical graph database 320 indirectly via a state resolver 340 that is configured to provide state resolution functions associated with handling of the real-time data records 303. The state resolver 340 may be configured to enforce an order of application of the real-time data records 303 to the historical graph database 320 for updating the history graph 321 of the historical graph database 320, thereby ensuring or tending to ensure that errors are not encountered when updating the historical graph database 320 based on the real-time data records 303.

In the example process 300, the users 301 may initiate a set of query operations 305 via one or more user devices. The execution of the query operations 305 results in retrieval of a set of historical data records 306. The historical data records 306 are retrieved from the historical graph database 320 based on the query operations 305 (e.g., based on execution of the query operations 305 on the history graph 321 of the historical graph database 320). The historical data records 306 may be presented to the users 301 in various ways (e.g., via one or more user devices).

Figure 4:
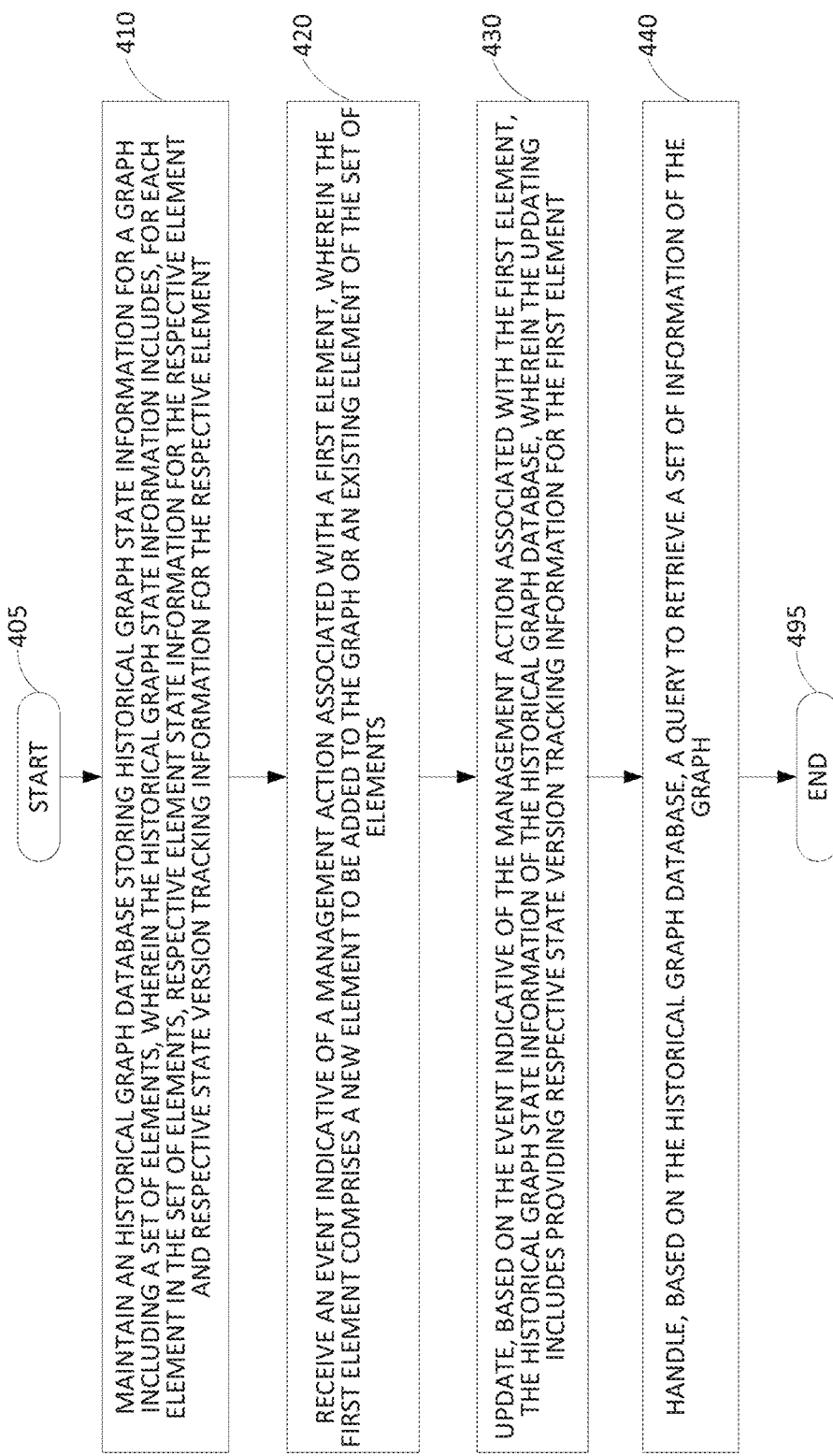
FIG. 4 illustrates a flowchart of an example method 400 for providing an historical graph database.

FIG. 4 illustrates a flowchart of an example method 400 for providing an historical graph database, in accordance with the present disclosure. In one example, the method 400 is performed by a graph database system (e.g., the A&AI system 150 of FIG. 1), or by one or more components thereof, (e.g., a processor, or processors, performing operations stored in and loaded from a memory), or by a graph database system in conjunction with one or more other components, such as A&AI system 150 in conjunction with a client device (e.g., SDN controller 155, one of user devices 141 or 143, and so forth). In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system may maintain an historical graph database storing historical graph state information for a graph including a set of elements, wherein the historical graph state information includes, for each element in the set of elements, respective element state information for the respective element and respective state version tracking information for the respective element. In one example, for at least one element in the set of elements of the graph, the respective state version tracking information for the respective element includes timestamp information associated with the respective element state information for the respective element and source of truth information associated with the respective element state information for the respective element. In one example, timestamp information includes a starting timestamp and an ending timestamp, where the source of truth information includes a starting source of truth and an ending source of truth.

At step 420, the processing system may receive an event indicative of a management action associated with a first element, wherein the first element comprises a new element to be added to the graph or an existing element of the set of elements. In one example, the event indicative of the management action associated with the first element is received based on a subscription to an event bus associated with a graph database for the graph.

At step 430, the processing system may update, based on the event indicative of the management action associated with the first element, the historical graph state information of the historical graph database, wherein the updating includes providing respective state version tracking information for the first element.

In at least some examples, the updating of the historical graph state information of the historical graph database may be based on the action type of the management action associated with the first element. For instance, when the management action comprises a create action and the first element is the new element for the graph, updating the historical graph state information of the historical graph database may include providing new element state information for the first element and providing new state version tracking information for the new element state information for the first element (e.g., at least one of a start-TS and a start-SOT). In an example in which the management action comprises an update action and the first element is the existing element of the set of elements, updating the historical graph state information of the historical graph database may comprise updating existing element state information for the first element and providing updated state version tracking information for the existing element state information for the first element (e.g., at least one of a start-TS and a start-SOT). In an example in which the management action comprises a delete action and the first element is the existing element of the set of elements, updating the historical graph state information of the historical graph database may comprise providing updated state version tracking information for existing element state information for the first element (e.g., at least one of an end-TS and an end-SOT).

In at least some examples, the updating of the historical graph state information of the historical graph database based on the event indicative of the management action associated with the first element may be performed based on a state resolution function. For instance, the processing system may perform a determination as to whether the first element is dependent on a second element associated with a second event and update, based on the determination as to whether the first element is dependent on the second element, the historical graph state information of the historical graph database. In one example, step 430 may comprise processing the event indicative of the management action associated with the first element, based on a determination that the first element is not dependent on the second element (e.g., without delay). In one example, based on a determination that the first element is dependent on the second element, the processing system may update the historical graph state information to include a placeholder for the first element and may perform, based on a determination that handling of the second event has been completed and based on the placeholder for the first element, a processing of the event indicative of the management action associated with the first element. In one example, step 430 may comprise delaying, based on a determination that the first element is dependent on the second element, a processing of the event indicative of the management action associated with the first element and performing, based on a determination that handling of the second event has been completed, the processing of the event indicative of the management action associated with the first element.

At step 440, the processing system may handle, based on the historical graph database, a query to retrieve a set of information of the graph. In one example, the query to retrieve the set of information of the graph comprises a query for a state of one of the elements of the set of elements at one or more points in time. In one example, the query to retrieve the set of information of the graph comprises a query for a set of updates on one of the elements of the set of elements since a point in time. In one example, the query to retrieve the set of information of the graph comprises a query for a set of updates on one of the elements of the set of elements over a lifecycle of the one of the elements. In one example, handling the query to retrieve the set of information of the graph includes receiving the query to retrieve the set of information of the graph and providing, using the historical graph database, a query response including the set of information of the graph.

Following step 440, the method 400 proceeds to step 495 where the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as repeating steps 420 and 430 to support handling of additional events indicative of management actions associated with other existing elements or new elements, repeating step 440 for handling additional queries for retrieving information of the graph, and so forth. Thus, it will be appreciated that these and other modifications are all contemplated within the scope of the present disclosure.

In addition, although not expressly specified above, one or more steps of the method 400 may include a storing, displaying, and/or outputting step as required for a particular application. In other words, any data, records, fields, and/or intermediate results discussed in the method(s) can be stored, displayed, and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative example and is not intended to indicate that steps not labelled as optional steps to be deemed to be essential steps. Furthermore, operations, steps, or blocks of the above described method(s) can be combined, separated, and/or performed in a different order from that described above, without departing from the examples of the present disclosure.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

Figure 5:
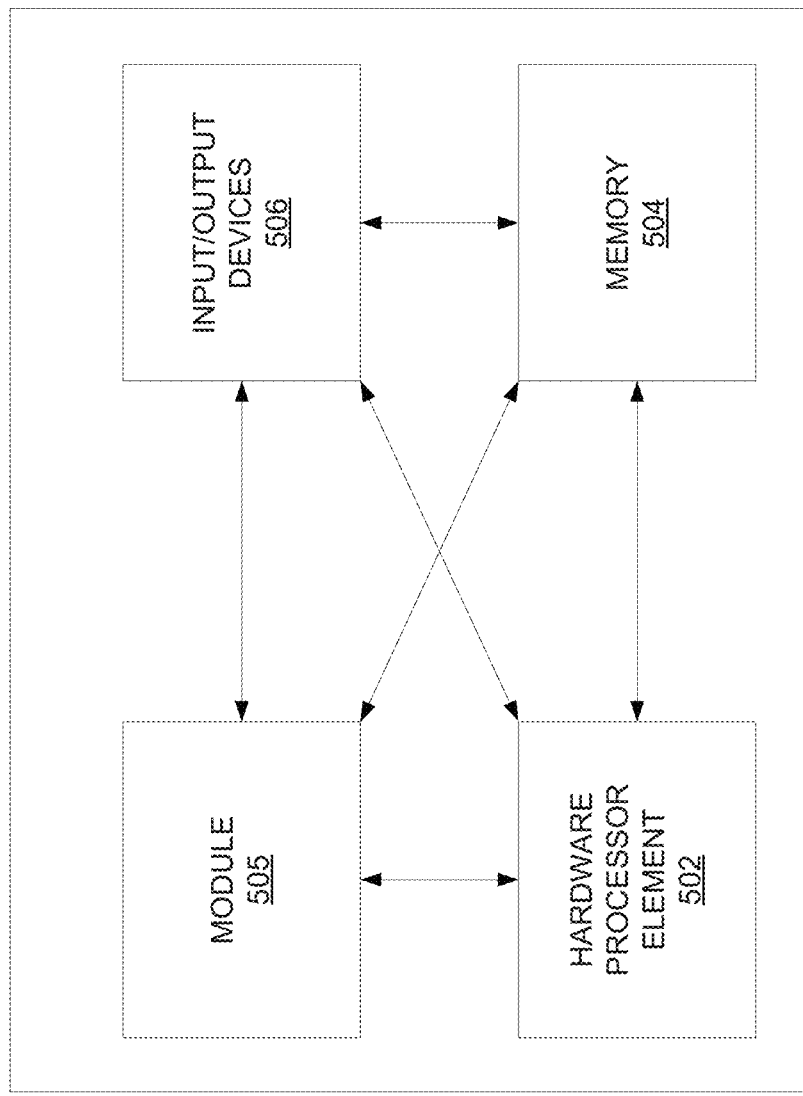
FIG. 5 illustrates a high level block diagram of a computing system specifically programmed to perform the steps, functions, blocks and/or operations described herein.

FIG. 5 depicts a high-level block diagram of a computing system 500 (e.g., a computing device or processing system) specifically programmed to perform the functions described herein. For example, any one or more components or devices illustrated in FIG. 1, FIG. 2, or FIG. 3, or described in connection with the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for providing an historical graph database, and one or more input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 505 for providing an historical graph database (e.g., a software program comprising computer-executable instructions) can be loaded into memory 504 and executed by hardware processor element 502 to implement the steps, functions or operations as discussed above in connection with the example method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the module 505 for providing an historical graph database (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
   maintaining, by a processing system including at least one processor, an historical graph database storing historical graph state information for a graph including a set of elements, wherein the historical graph state information includes, for each element in the set of elements, respective element state information for the respective element and respective state version tracking information for the respective element;
   receiving, by the processing system, an event indicative of a management action associated with a first element, wherein the first element comprises a new element to be added to the graph or an existing element of the set of elements;
   updating, by the processing system based on the event indicative of the management action associated with the first element, the historical graph state information of the historical graph database, wherein the updating includes providing respective state version tracking information for the first element; wherein the updating the historical graph state information of the historical graph database further includes:
      performing a determination as to whether the first element is dependent on a second element associated with a second event; and
      updating based on the determination as to whether the first element is dependent on the second element, the historical graph state information of the historical graph database; and
   handling, by the processing system based on the historical graph database, a query to retrieve a set of information of the graph.

2. The method of claim 1, wherein, for at least one element in the set of elements of the graph, the respective state version tracking information for the respective element includes:
   timestamp information associated with the respective element state information for the respective element; and
   source of truth information associated with the respective element state information for the respective element.

3. The method of claim 2, wherein the timestamp information includes a starting timestamp and an ending timestamp, wherein the source of truth information includes a starting source of truth and an ending source of truth.

4. The method of claim 1, wherein the event indicative of the management action associated with the first element is received based on a subscription to an event bus associated with a graph database for the graph.

5. The method of claim 1, wherein the management action comprises a create action and the first element is the new element for the graph, wherein updating the historical graph state information of the historical graph database comprises:

providing new element state information for the first element; and
providing new state version tracking information for the new element state information for the first element.

6. The method of claim 5, wherein the new state version tracking information comprises at least one of a starting timestamp or a starting source of truth.

7. The method of claim 1, wherein the management action comprises an update action and the first element is the existing element of the set of elements, wherein updating the historical graph state information of the historical graph database comprises:
updating existing element state information for the first element; and
providing updated state version tracking information for the existing element state information for the first element.

8. The method of claim 7, wherein the updated state version tracking information comprises at least one of a starting timestamp or a starting source of truth.

9. The method of claim 1, wherein the management action comprises a delete action and the first element is the existing element of the set of elements, wherein updating the historical graph state information of the historical graph database comprises:
providing updated state version tracking information for existing element state information for the first element.

10. The method of claim 9, wherein the updated state version tracking information comprises at least one of an ending timestamp or an ending source of truth.

11. The method of claim 1, wherein the query to retrieve the set of information of the graph comprises a query for a state of one of the elements of the set of elements at one or more points in time.

12. The method of claim 1, wherein the query to retrieve the set of information of the graph comprises a query for a set of updates on one of the elements of the set of elements since a point in time.

13. The method of claim 1, wherein the query to retrieve the set of information of the graph comprises a query for a set of updates on one of the elements of the set of elements over a lifecycle of the one of the elements.

14. The method of claim 1, wherein the handling the query to retrieve the set of information of the graph comprises:
receiving, by the processing system, the query to retrieve the set of information of the graph; and
providing, by the processing system using the historical graph database, a query response including the set of information of the graph.

15. The method of claim 1, wherein the updating the historical graph state information of the historical graph database based on the determination as to whether the first element is dependent on the second element comprises:
processing, by the processing system based on a determination that the first element is not dependent on the second element, the event indicative of the management action associated with the first element.

16. The method of claim 1, wherein the updating the historical graph state information of the historical graph database based on the determination as to whether the first element is dependent on the second element comprises:
updating, by the processing system based on a determination that the first element is dependent on the second element, the historical graph state information to include a placeholder for the first element; and
performing, by the processing system based on a determination that handling of the second event has been completed and based on the placeholder for the first element, a processing of the event indicative of the management action associated with the first element.

17. The method of claim 1, wherein the updating the historical graph state information of the historical graph database based on the determination as to whether the first element is dependent on the second element comprises:
delaying, by the processing system based on a determination that the first element is dependent on the second element, a processing of the event indicative of the management action associated with the first element; and
performing, by the processing system based on a determination that handling of the second event has been completed, the processing of the event indicative of the management action associated with the first element.

18. An apparatus comprising:
a processing system including at least one processor; and
a non-transitory computer-readable medium storing instructions which, when executed by the processing system, cause the processing system to perform operations, the operations comprising:
maintaining an historical graph database storing historical graph state information for a graph including a set of elements, wherein the historical graph state information includes, for each element in the set of elements, respective element state information for the respective element and respective state version tracking information for the respective element;
receiving an event indicative of a management action associated with a first element, wherein the first element comprises a new element to be added to the graph or an existing element of the set of elements;
updating, based on the event indicative of the management action associated with the first element, the historical graph state information of the historical graph database, wherein the updating includes providing respective state version tracking information for the first element, wherein the updating the historical graph state information of the historical graph database further includes:
performing a determination as to whether the first element is dependent on a second element associated with a second event; and
updating based on the determination as to whether the first element is dependent on the second element, the historical graph state information of the historical graph database; and
handling, based on the historical graph database, a query to retrieve a set of information of the graph.

19. A non-transitory computer-readable medium storing instructions which, when executed by a processing system including at least one processor, cause the processing system to perform operations, the operations comprising:
maintaining an historical graph database storing historical graph state information for a graph including a set of elements, wherein the historical graph state information includes, for each element in the set of elements, respective element state information for the respective element and respective state version tracking information for the respective element;
receiving an event indicative of a management action associated with a first element, wherein the first element comprises a new element to be added to the graph or an existing element of the set of elements;

updating, based on the event indicative of the management action associated with the first element, the historical graph state information of the historical graph database, wherein the updating includes providing respective state version tracking information for the first element, wherein the updating the historical graph state information of the historical graph database further includes:
  performing a determination as to whether the first element is dependent on a second element associated with a second event; and
  updating based on the determination as to whether the first element is dependent on the second element, the historical graph state information of the historical graph database; and
handling, based on the historical graph database, a query to retrieve a set of information of the graph.

20. The non-transitory computer-readable medium of claim 19, wherein, for at least one element in the set of elements of the graph, the respective state version tracking information for the respective element includes:
  timestamp information associated with the respective element state information for the respective element; and
  source of truth information associated with the respective element state information for the respective element.

* * * * *